US008824309B2

(12) United States Patent
Chen et al.

(10) Patent No.: US 8,824,309 B2
(45) Date of Patent: Sep. 2, 2014

(54) METHOD AND DEVICE FOR JUDGING RADIO LINK FAILURE IN CARRIER AGGREGATION TECHNOLOGY

(75) Inventors: Li Chen, Beijing (CN); Jiamin Liu, Beijing (CN); Jing Liang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 226 days.

(21) Appl. No.: 13/390,332

(22) PCT Filed: Aug. 13, 2010

(86) PCT No.: PCT/CN2010/001235
§ 371 (c)(1),
(2), (4) Date: Feb. 13, 2012

(87) PCT Pub. No.: WO2011/017914
PCT Pub. Date: Feb. 17, 2011

(65) Prior Publication Data
US 2012/0147755 A1 Jun. 14, 2012

(30) Foreign Application Priority Data
Aug. 13, 2009 (CN) .......................... 2009 1 0090483

(51) Int. Cl.
*H04L 12/26* (2006.01)
*H04W 24/00* (2009.01)
*H04L 25/02* (2006.01)
*H04L 5/00* (2006.01)
*H04W 24/10* (2009.01)
*H04W 76/02* (2009.01)

(52) U.S. Cl.
CPC ........... *H04L 25/0208* (2013.01); *H04W 24/10* (2013.01); *H04W 76/028* (2013.01); *H04L 5/001* (2013.01)
USPC ........................................................ 370/242

(58) Field of Classification Search
CPC . H04L 5/001; H04L 25/0208; H04W 76/028; H04W 24/10
USPC ........................................................ 370/242
See application file for complete search history.

(56) References Cited

U.S. PATENT DOCUMENTS 8,064,414 B2 * 11/2011 Wallace et al. ................ 370/338
2010/0240359 A1 * 9/2010 Wu ................................ 455/424
(Continued)

FOREIGN PATENT DOCUMENTS

CN 101150380 A 3/2008
CN 101483927 A 7/2009
(Continued)

OTHER PUBLICATIONS

PCT International Search Report for PCT Counterpart Application No. PCT/CN2010/001235 containing Communication relating to the Results of the International Search Report, 11 pgs., (Nov. 18, 2010).

(Continued)

*Primary Examiner* — Mark Rinehart
*Assistant Examiner* — Kenneth P Hunt
(74) *Attorney, Agent, or Firm* — Blakely, Sokoloff, Taylor & Zafman LLP

(57) ABSTRACT

The present invention discloses a method and device for judging Radio Link Failure (RLF) in Carrier Aggregation (CA) technology, which are used to effectively judge whether a radio link is failed or not in CA technology. Said method comprises: on an evaluation point, comparing the determined radio link quality parameter of each carrier participating in the RLF judgement with the corresponding radio link quality parameter threshold, determining whether to trigger an in-sync indication or out-of-sync indication on the evaluation point, and judging whether the radio link of the User Equipment (UE) is failed according to the number of the continuously received in-sync indications or out-of-sync indications. The embodiment of the present invention determines whether to trigger an in-sync indication or out-of-sync indication by comparing the radio link quality parameters of the carriers participating in the RLF judgement with the corresponding radio link quality parameter thresholds, and thereby judges that whether the radio link is failed or not in CA technology.

14 Claims, 2 Drawing Sheets

(56) References Cited

U.S. PATENT DOCUMENTS

| | | | |
|---|---|---|---|
| 2010/0296389 A1* | 11/2010 | Khandekar et al. | 370/216 |
| 2010/0302951 A1* | 12/2010 | Ou | 370/242 |
| 2010/0330920 A1* | 12/2010 | Koskela et al. | 455/67.11 |
| 2011/0021154 A1* | 1/2011 | Marinier et al. | 455/67.11 |
| 2011/0211458 A1* | 9/2011 | Ishii et al. | 370/242 |
| 2011/0292812 A1* | 12/2011 | Kim et al. | 370/242 |

FOREIGN PATENT DOCUMENTS

| | | | |
|---|---|---|---|
| WO | WO 2010/032775 | * | 3/2010 |
| WO | WO 2010/087659 | * | 8/2010 |

OTHER PUBLICATIONS

PCT Written Opinion of the International Searching Authority for PCT Counterpart Application No. PCT/CN2010/001235, 8 pgs., (Nov. 18, 2010).

PCT Notification concerning Transmittal of International Preliminary Report on Patentability (Chapter I of the Patent Cooperation Treaty) for PCT Counterpart Application No. PCT/CN2010/001235, 11 pgs., (Feb. 23, 2012).

Cheng, Shunchuan, et al., "Application of Carriers Aggregation Technology in LTE-Advanced System", Mobile Communications, vol. 33, No. 8, pp. 52-55, (Apr. 2009).

Cao, Gen, et al., "Multi-Carriers Aggregation Technology in LTE-Advanced System", Modern Science & Technology of Telecommunications, No. 2, pp. 48-51, (Feb. 2009).

Report ITU-R M.2134, "Requirements related to Technical Performance for IMT-Advanced Ratio Interface(s)", 8 pgs., (2008).

EPO Office Action for European Counterpart Application No. 10807859.3, 5 pages, (Jun. 19, 2013).

EPO Search Report for European Counterpart Application No. 10807859.3, 4 pages, (May 24, 2013).

LG Electronics Inc., "Radio Link Failure considering Carrier Aggregation", 3GPP TSG-RAN2 Meeting #66bis. Draft No. R2-093856, Los Angeles, USA, XP50352063A, 3 pages, (Jun. 29-Jul. 3, 2009).

Interdigital, "DL Radio Link Failure Procedures for Carrier Aggregation", 3GPP TSG-RAN WG2 Meeting #69, Draft No. R2-101303, San Francisco, USA, XP50421649A, 2 pages, (Feb. 22-26, 2010).

Interdigital, "RLF Procedures for Carrier Aggregation", 3GPP TSG-RAN WG2 Meeting #67bis, Draft Nos. R2-095631 and R2-094218, Miyazaki, Japan, XP50390146A, 3 pages, (Oct. 12-16, 2009).

Ericsson, et al., "Radio Link Failure for Carrier Aggregation", 3GPP TSG-RAN WG2 #67-bis, Draft No. R2- 095807, Miyazaki, Japan, XP50390292A, 2 pages, (Oct. 12-16, 2009).

Qualcomm Europe, "Radio Link Monitoring in a Multicarrier Setting", 3GPP TSG-RAN WG2 #66bis, Draft No. R2-093872, Los Angeles, USA, XP50352076A, 2 pages, (Jun. 29-Jul. 3, 2009).

* cited by examiner

METHOD AND DEVICE FOR JUDGING RADIO LINK FAILURE IN CARRIER AGGREGATION TECHNOLOGY

CROSS-REFERENCE TO RELATED APPLICATIONS

This application is a US National Stage of International Application No. PCT/CN2010/001235 filed 13 Aug. 2010, designating the United States and claiming the benefit of Chinese Patent Application No. 200910090483.8, filed with the Chinese Patent Office on Aug. 13, 2009 and entitled "Method and device for judging radio link failure in carrier aggregation", the entirety of which is hereby incorporated by reference.

FIELD

The present invention relates to the field of communications and particularly to a method and device for judging radio link failure in Carrier Aggregation (CA).

BACKGROUND

A Long Term Evolution-Advanced (LTE-Advanced) system is provided with greatly improved peak rates, and carrier aggregation has been introduced to the LTE-A system for better compatibility with an LTE system.

Unlike a User Equipment (UE) operating over a single carrier in the LTE system, the use of carrier aggregation can have the UE operate concurrently over a plurality of uplink and downlink component carriers. An E-UTRAN NodeB (eNB) can manage and schedule the plurality of component carriers to have the UE switch between the different component carriers. The respective component carriers may be consecutive or inconsecutive, and for better compatibility with the LTE system, the maximum bandwidth of each component carrier is 20 MHz, and the bandwidths of the respective component carriers may be identical or different. A plurality of types of carriers, particularly a backwards compatible carrier, a non-backwards compatible carrier and an extension carrier, may be involved in carrier aggregation.

In the LTE system, methods in which the UE judges whether a radio link fails include:

(1) The UE determines whether a T310 timer expires;

(2) The UE determines whether a random access problem indication transmitted from the Medium Access Control (MAC) layer is received when T300, T301, T304 and T311 are disabled; and (3) The UE determines whether an indication of reaching the maximum number of retransmissions transmitted from the Radio Link Control (RLC) layer is received.

Particularly the method in which the UE judges whether a radio link fails according to whether a T310 timer expires includes:

When a number N310 of out-of-sync indications transmitted from the physical layer of the UE are received continuously at the Radio Resource Control (RRC) layer thereof and all the timers T300, T301, T304 and T311 are disabled, a T310 timer is enabled at the RRC layer of the UE to monitor for a preset judgment length of time, and if a number N311 of in-sync indications transmitted from the physical layer of the UE are received continuously at the RRC layer thereof during operation of T310, then it is judged at the RRC layer of the UE that a radio link does not fail, and the timer T310 is disabled; otherwise, failure of the radio link is judged at the RRC layer of the UE upon expiration of T310.

In the foregoing implementation, it is necessary to measure a Cell specific Reference Signal (CRS) at the physical layer of the UE to detect the quality of a downlink radio link and thereby determine whether to transmit an out-of-sync or in-sync indication to an upper layer, i.e., the RRC layer. In a Discontinuous Reception (DRX) mode, the quality of a radio link is evaluated at least once in each DRX period, and the result of calculating the quality of the radio link in the evaluation period is compared with a radio link quality parameter threshold to determine whether to transmit an out-of-sync or in-sync indication to the upper layer. In a non-DRX mode, the UE assesses the quality of a radio link at the physical layer for a specific sub-frame of each radio frame, and the result of calculating the quality of the radio link in each evaluation period is compared with a radio link quality parameter threshold to determine whether to transmit an out-of-sync or in-sync indication to the upper layer. Particularly a point of time at which the UE evaluates the quality of a radio link is referred to as an evaluation point.

In a specific process of determining whether to transmit an out-of-sync or in-sync indication to the upper layer, the UE transmits an out-of-sync indication to the upper layer when the result of calculating the quality of a radio link is below a first radio link quality parameter threshold $Q_{out}$, that is, when a current channel quality is poorer than a channel quality corresponding to $Q_{out}$, or the UE transmits an in-sync to the upper layer when the result of calculating the quality of the radio link is above a second radio link quality parameter threshold $Q_{in}$, that is, when the current channel quality is better than a channel quality corresponding to $Q_{in}$. The out-of-sync indication corresponds to an evaluation period of 200 ms, and the in-sync indication corresponds to an evaluation period of 100 ms. Particularly the first radio link quality parameter threshold $Q_{out}$ and the second radio link quality parameter threshold $Q_{in}$ are not configured values but resulting statistics of a Block Error Rate (BER) corresponding to the quality of a downlink radio link being above 10% and below 2% under the parameter condition of a specific bandwidth, etc., specified in the protocol 3GPP TS 36.133.

In summary, since a UE operates over a single carrier in the LTE system, whether a radio link of the single carrier fails can be judged simply by determining the quality of the radio link; however, in the LTE-A system with carrier aggregation, a deteriorated-quality radio link of a carrier may not imply that a UE can not perform normal transmission of data. Therefore a method for judging radio link failure in a multi-carrier operating context is desired in the LTE-A system.

SUMMARY

In view of this, embodiments of the invention provide a method and device for judging radio link failure in carrier aggregation to judge effectively in carrier aggregation whether a radio link fails.

An embodiment of the invention provides a method for judging radio link failure in carrier aggregation, which includes:

a User Equipment, UE, determining radio link quality parameters of one or more carriers involved in judgment of radio link failure;

the UE comparing on evaluation points each determined radio link quality parameter with a corresponding radio link quality parameter threshold and determining whether to trigger an in-sync indication or an out-of-sync indication on the evaluation points; and judging failure of a radio link of the UE when the UE does not receive continuously a preset number of in-sync indications in a preset judgment length of time.

An embodiment of the invention provides a device for judging radio link failure in carrier aggregation, which includes:

a determining module configured to determine radio link quality parameters of one or more carriers involved in judgment of radio link failure;

a triggering module configured to compare on evaluation points each determined radio link quality parameter with a corresponding radio link quality parameter threshold and to determine whether to trigger an in-sync indication or an out-of-sync indication on the evaluation points; and a judging module configured to judge failure of a radio link of the UE when a preset number of in-sync indications are not received continuously in a preset judgment length of time.

The embodiments of the invention provide a method and device for judging radio link failure in carrier aggregation, and in the method, determined radio link quality parameters of a specific carrier(s) involved in judgment of radio link failure are compared on evaluation points with corresponding radio link quality parameter thresholds, it is determined whether to trigger an in-sync indication or an out-of-sync indication on the evaluation points, and whether a radio link of the UE fails is judged according to the number of continuously received in-sync indications or out-of-sync indications, and thus in the embodiments of the invention, the radio link quality parameters of the carrier(s) involved in judgment of radio link failure are compared on evaluation points with the corresponding radio link quality parameter thresholds to thereby determine whether to trigger an in-sync indication or an out-of-sync indication, thus judging in carrier aggregation whether a radio link fails.

DETAILED DESCRIPTION

In order to judge radio link failure in carrier aggregation, an embodiment of the invention provides a method for judging radio link failure in carrier aggregation, and this method includes: a UE comparing on evaluation points a determined radio link quality parameter of each carrier involved in judgment of radio link failure with each corresponding radio link quality parameter threshold; determining whether to trigger an in-sync or out-of-sync indication on the evaluation points; and judging whether a radio link of the UE fails according to the number of continuously received in-sync or out-of-sync indications. In an embodiment of the invention, the radio link quality parameter of each carrier involved in judgment of radio link failure is compared with the corresponding radio link quality parameter threshold to thereby determine whether to trigger an in-sync or out-of-sync indication on the evaluation points, thus judging in carrier aggregation whether a radio link of the UE fails.

Embodiments of the invention will be detailed below with reference to the drawings.

Figure 1:
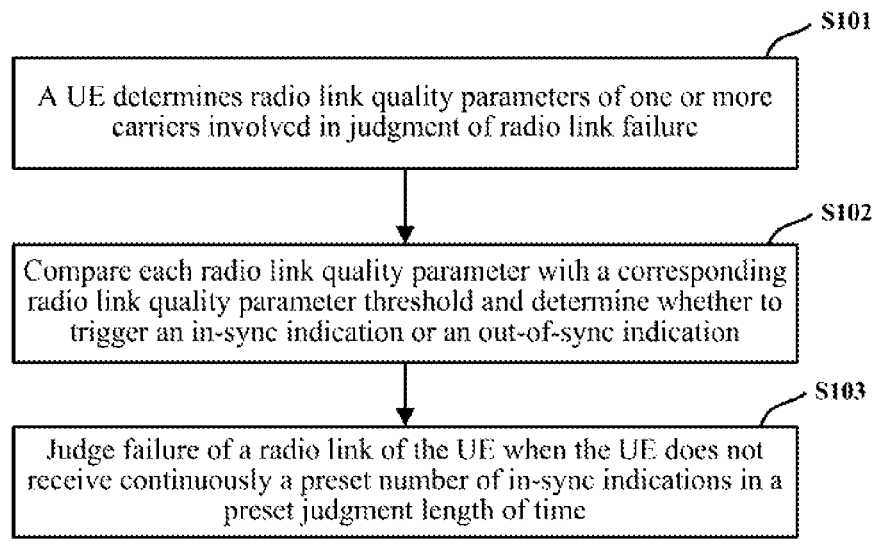
FIG. 1 is a process of judging radio link failure in carrier aggregation according to an embodiment of the invention.

FIG. 1 is a process of judging radio link failure in carrier aggregation according to an embodiment of the invention, and this process includes the following operations:

S101: A UE determines radio link quality parameters of one or more carriers involved in judgment of radio link failure.

Since the UE operates over a plurality of carriers, it is necessary for the UE to determine radio link quality parameters of one or more carriers involved in judgment of radio link failure, and this process includes:

Respective carriers of the UE are determined as carriers involved in judgment of radio link failure, CRSs of the respective carriers are measured respectively, and respective instantaneous measurement results are filtered based upon an evaluation period, thereby acquiring radio link quality parameters of the respective carriers; or the UE measures CRSs of the respective carriers, selects the largest value among measurement results of the respective carriers and determines a first carrier corresponding to the largest value as a carrier involved in judgment of radio link failure, that is, only one instantaneous value is measured each time and L1-filtered based upon an evaluation period to acquire a radio link quality parameter corresponding to the first carrier; or an primary carrier or a serving carrier of the UE is determined as a carrier involved in judgment of radio link failure, a CRS of the primary carrier is measured, and respective measurement values are filtered based upon an evaluation period to acquire a radio link quality parameter corresponding to the primary carrier, which is also referred to as a serving cell if each carrier subject to carrier aggregation is regarded as a separate cell, where a CRS of a carrier is measured at the physical layer of the UE.

S102: The UE compares on evaluation points each determined radio link quality parameter with a corresponding radio link quality parameter threshold and determine whether to trigger an in-sync indication or an out-of-sync indication on the evaluation points.

Particularly in the process of determining whether to trigger an in-sync indication or an out-of-sync indication, when respective carriers of the UE are determined as carriers involved in judgment of radio link failure, it is determined whether the respective carriers correspond to the same radio link quality parameter thresholds; and when the respective carriers correspond to the same radio link quality parameter thresholds, the largest value among the radio link quality parameters of the respective carriers is selected and compared with the radio link quality parameter thresholds, and an out-of-sync indication is triggered when the largest value is below the first radio link quality parameter threshold or an in-sync indication is triggered when the largest value is above the second radio link quality parameter threshold; or when the respective carriers correspond to different radio link quality parameter thresholds, the radio link quality parameters of the respective carriers are compared with the radio link quality parameter thresholds corresponding to the respective carriers, and an out-of-sync indication is triggered when the radio link quality parameters of the respective carriers are below first radio link quality parameter thresholds corresponding to the respective carriers or an in-sync indication is triggered when a radio link quality parameter of at least one carrier is above a second radio link quality parameter threshold corresponding to the carrier. An evaluation point is a point of time at which the UE evaluates the quality of a radio link. That is, if none of the radio link quality measurement values of the respective carriers involved in judgment of radio link failure is above a first radio link quality parameter threshold corresponding to the same carrier, then an out-of-sync indication is triggered, or if one of the radio link quality measurement values is above a second radio link quality parameter threshold corresponding to the same carrier, then an in-sync indication is triggered.

S103: Failure of a radio link of the UE is judged when the UE does not receive continuously a preset number of in-sync indications in a preset judgment length of time according to the number of continuously received in-sync indications or out-of-sync indications and a preset timer.

For the UE to judge whether a radio link of the UE fails, when the UE receives continuously a first number of out-of-sync indications and all the timers in a second set of timers are disabled, a timer preset to monitor for a preset judgment length of time is enabled, and it is determined whether a second number of in-sync indications are received continuously during counting of the preset timer, and the UE disables the timer upon reception of the second number of in-sync indications, that is, the radio link of the UE does not fail, or the UE judges failure of the radio link thereof when the second number of in-sync indications are not received continuously, where whether the radio link fails is judged at the RRC layer of the UE.

In an embodiment of the invention, whether to trigger an in-sync indication or an out-of-sync indication can be determined at the physical layer of the UE in numerous methods, some of which will be described below in particular embodiments.

When the UE determines each carrier thereof as a carrier involved in judgment of radio link failure, CRSs of the respective carriers are measured respectively at the physical layer of the UE, and respective instantaneous measurement results are filtered based upon an evaluation period to thereby acquire the radio link quality parameters of the respective carriers, and then it is determined whether the respective carriers correspond to the same radio link quality parameter thresholds, and when it is determined that the respective carriers correspond to the same radio link quality parameter thresholds, the largest value among the radio link quality parameters of the respective carriers is selected on each evaluation point and compared with the radio link quality parameters threshold corresponding to the respective carriers, and whether to trigger an in-sync indication or an out-of-sync indication on the evaluation point is determined according to the result of comparison; or when the respective carriers correspond to different radio link quality parameter thresholds, the radio link quality parameters of the respective carriers are compared on each evaluation point with the radio link quality parameter thresholds corresponding to the respective carriers, and whether to trigger an in-sync indication or an out-of-sync indication on the evaluation point is determined according to the result of comparison.

Whether to trigger an in-sync indication or an out-of-sync indication can be determined in a combination of the foregoing two methods when not all the radio link quality parameter thresholds of the respective carriers are the same, for example, when two carriers have the same radio link quality parameter thresholds. For example, there are three carriers of the UE which are involved in judgment of radio link failure, i.e., a first carrier, a second carrier and a third carrier, respectively, where the first carrier and the second carrier have the same radio link quality parameter thresholds, whether to trigger an in-sync indication or an out-of-sync indication on the evaluation points can be determined by selecting the largest radio link quality parameter value among radio link quality parameters of the first carrier and the second carrier and comparing the largest value with the radio link quality parameter thresholds corresponding to the two carriers, and by comparing the radio link quality parameter of the third carrier with the radio link quality parameter thresholds corresponding to the third carrier.

When CRSs of respective carriers are measured at the physical layer of the UE, the largest value among measurement results of the respective carriers is acquired, a first carrier corresponding to the largest value is determined as a carrier involved in judgment of radio link failure, the largest value is taken as a current instantaneous value, that is, there is only one instantaneous value measured each time, and the instantaneous value of each time is L1-filtered based upon an evaluation period, and a radio link quality parameter corresponding to the first carrier is acquired and then compared on the evaluation points with a radio link quality parameter threshold corresponding to the first carrier, and whether to trigger an in-sync indication or an out-of-sync indication on the evaluation points is determined according to the result of comparison.

When the UE determines an primary carrier as a carrier involved in judgment of radio link failure, a CRS of the primary carrier of the UE is measured at the physical layer thereof, respective measurement values are filtered based upon an evaluation period, and a radio link quality parameter corresponding to the primary carrier is acquired and then compared on the evaluation points with a radio link quality parameter threshold corresponding to the primary carrier, and whether to trigger an in-sync indication or an out-of-sync indication on the evaluation points is determined according to the result of comparison, where the primary carrier is a specific carrier configured at the RRC layer of the network side. For example, the primary carrier which is a primary operating carrier can also be referred to a serving carrier or a serving cell, and there can be only one primary carrier.

In an embodiment of the invention, the UE determines a carrier involved in judgment of radio link failure as an activated carrier configured at the RRC layer of the network side, which can be an independently operating carrier including a backwards compatible carrier and a non-backwards compatible carrier in a radio link.

In the foregoing embodiment, in the process of determining whether to trigger an in-sync indication or an out-of-sync indication on the evaluation points according to the result of comparison when the respective carriers of the UE are determined as carriers involved in judgment of radio link failure and the respective carriers correspond to the same radio link quality parameter thresholds, the largest radio link quality parameter value among the radio link quality parameters of the respective carriers is selected and compared with the radio link quality parameter thresholds, and an out-of-sync indication is triggered on the evaluation points when the largest radio link quality parameter value is below the first radio link quality parameter threshold or an in-sync indication is triggered on the evaluation points when the largest radio link quality parameter value is above the second radio link quality parameter threshold, In the process of determining whether to trigger an in-sync indication or an out-of-sync indication on the evaluation points according to the result of comparison when the respective carriers of the UE are determined as carriers involved in judgment of radio link failure and the respective carriers correspond to different radio link quality parameter thresholds, the radio link quality parameters of the respective carriers are compared with the radio link quality parameter thresholds corresponding to the respective carriers, and an out-of-sync indication is triggered on the evaluation points when all the radio link quality parameter of the respective carriers are below first radio link quality parameter thresholds corresponding to the respective carriers or an in-sync indication is triggered on the evaluation points when a radio link quality parameter of at least one carrier is above a second radio link quality parameter threshold corresponding to the carrier.

In the foregoing embodiment (i.e., when the UE operates over the first, second and third carriers and the first carrier and the second carrier correspond to the same radio link quality parameter thresholds, then the largest radio link quality parameter value among the radio link quality parameters of the first carrier and the second carrier is selected and compared with the radio link quality parameter thresholds corresponding to the first carrier and the second carrier, and the radio link quality parameter of the third carrier is compared with the radio link quality parameter thresholds corresponding to the third carrier), an out-of-sync indication is triggered on the evaluation points when the largest value is below a first radio link quality parameter threshold and the radio link quality parameter of the third carrier is below a radio link quality parameter threshold corresponding to the third carrier, or an in-sync indication is triggered on the evaluation points when the largest value is above the first radio link quality parameter threshold and/or the radio link quality parameter of the third carrier is above the radio link quality parameter threshold corresponding to the third carrier.

When the radio link quality parameter of only one carrier is compared with the radio link quality parameter thresholds corresponding to the carrier, particularly when the radio link quality parameter of a first carrier is compared with the radio link quality parameter thresholds of the first carrier or the radio link quality parameter of an primary carrier is compared with the radio link quality parameter thresholds of the primary carrier, an out-of-sync indication is triggered on the evaluation points when the radio link quality parameter of the carrier is below the first radio link quality parameter threshold corresponding to the carrier or an in-sync indication is triggered on the evaluation points when the radio link quality parameter of the carrier is above the second radio link quality parameter threshold corresponding to the carrier.

In the foregoing embodiment, the radio link quality parameter of the carrier being below the first radio link quality parameter threshold particularly means that the radio link quality of the carrier being poorer than the first radio link quality threshold of the carrier, and the radio link quality parameter of the carrier being above the second radio link quality parameter threshold particularly means that the radio link quality of the carrier being better than the second radio link quality threshold of the carrier. Neither in-sync indication nor out-of-sync indication will be triggered when the radio link quality parameter of the carrier is equal to the first radio link quality parameter threshold or the second radio link quality parameter threshold.

An evaluation point in use may vary from one carrier to another because some carriers are in a DRX mode and some carriers are in a non-DRX mode in a radio link, and in order to facilitate subsequent determination of whether to trigger an in-sync indication or an out-of-sync indication for the evaluation point, the evaluation point will be determined in a corresponding method according to DRX modes of the respective carriers in an embodiment of the invention, and the method for determining an evaluation point will be detailed below.

When the UE operates over the respective carriers in the same DRX mode (that is, all the carriers are in the non-DRX mode or the DRX mode) and with the same DRX period, evaluation points are determined according to the DRX period of the respective carriers, particularly according to a radio frame, that is, a specific sub-frame of a specific radio frame carried over each carrier are taken as an evaluation point of the carrier, and the respective acquired radio link quality parameters are assessed uniformly on the evaluation point to thereby determine whether to trigger an in-sync indication or an out-of-sync indication and further judge whether the radio link fails.

When the UE operates over the respective carriers in different DRX mode (that is, some carriers are in the DRX mode and some carriers are in the non-DRX mode) or the respective carriers are in the same DRX mode but with different DRX periods, evaluation points are determined in such a method: the carrier with the shortest DRX period is selected, and respective evaluation points corresponding to the carrier with the shortest DRX period are taken as evaluation points of the respective carriers in the radio link, or the carrier with the longest DRX period is selected, and respective evaluation points corresponding to the carrier with the longest DRX period are taken as evaluation points of the respective carriers in the radio link; and the radio link quality parameter of each carrier involved in judgment of radio link failure is assessed uniformly on the evaluation points to thereby determine whether to trigger an in-sync indication or an out-of-sync indication and further judge whether the radio link fails.

Figure 2:
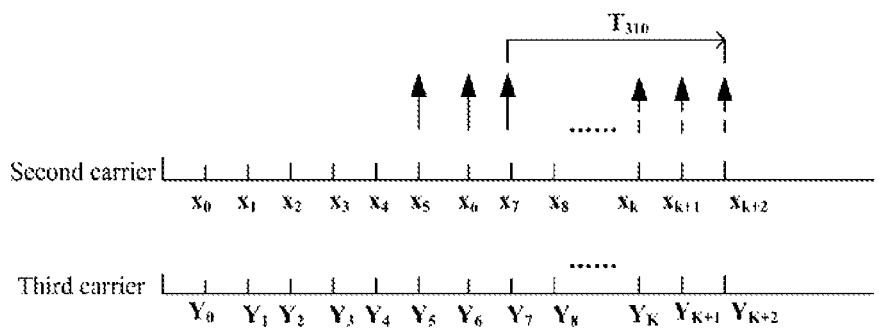
FIG. 2 is a first implementation of judging whether a radio link fails according to an embodiment of the invention.

FIG. 2 is an implementation in which whether an in-sync or out-of-sync indication is triggered to thereby judge whether a radio link fails when respective carriers are in the same DRX mode and with the same DRX period according to an embodiment of the invention. For example, the UE operates over two carriers, i.e., a second carrier and a third carrier, respectively, in the same DRX mode and with the same DRX period or in the same non-DRX mode, thus a specific sub-frame of each radio frame carried over the two respective carriers is taken as an evaluation point of the two respective carriers. As illustrated in FIG. 2, evaluation points over the second carrier are $X_0, X_1, X_2 \ldots X_{k+2}$ and evaluation points over the third carrier are $Y_0, Y_1, Y_2 \ldots Y_{k+2}$ with the evaluation points $X_0$ corresponding to $Y_0$, $X_1$ corresponding to $Y_1$, $X_2$ corresponding to $Y_2, \ldots, X_{k+2}$ corresponding to $Y_{k+2}$.

A radio link quality parameter of each carrier is determined respectively, and when the two carriers correspond to the same radio link quality parameter thresholds on the corresponding evaluation points of the two carriers, the largest value among the radio link quality parameters of the two carriers are determined and compared with the first radio link quality parameter threshold, and an out-of-sync indication is triggered on the evaluation points, e.g., the corresponding evaluation points $X_5$ ($Y_5$), $X_6$ ($Y_6$), $X_7$ ($Y_7$) . . . of the two carriers, as illustrated in FIG. 2, etc, when the largest radio link quality parameter value is below the first radio link quality parameter threshold, or an in-sync indication is triggered on the evaluation points, e.g., the corresponding evaluation points $X_k$ ($Y_k$), $X_{k+1}$ ($Y_{k+1}$) and $X_{k+2}$ ($Y_{k+2}$) of the two carriers, as illustrated in FIG. 2, etc., when the largest radio link quality parameter value is above the second radio link quality parameter threshold.

When the two carriers correspond to different radio link quality parameter thresholds, the radio link quality parameter of each carrier is compared on each corresponding evaluation point of the two carriers with the radio link quality parameter threshold corresponding to the carrier, and whether to trigger an in-sync indication or an out-of-sync indication on the evaluation point is determined according to the result of comparison. For example, an out-of-sync indication is triggered on the evaluation point when the radio link quality parameter of the second carrier is below the first radio link quality parameter threshold corresponding to the second carrier and the radio link quality parameter of the third carrier is below the first radio link quality parameter threshold corresponding to the third carrier; or an in-sync indication is triggered on the evaluation point when the radio link quality parameter of the second carrier is above the second radio link quality parameter threshold corresponding to the second carrier and/or the radio link quality parameter of the third carrier is above the second radio link quality parameter threshold corresponding to the third carrier.

When the UE measures cell-specific reference signals of the two carriers and the measurement result of the second carrier is larger than that of the third carrier, the second carrier is determined as a first carrier involved in judgment of radio link failure, and the radio link quality parameter of the second carrier is acquired, or when the second carrier is an primary carrier, the radio link quality parameter of the primary carrier is acquired. When the two carriers are in the same DRX mode, evaluation points, e.g., the respective evaluation points over the second carrier, as illustrated in FIG. 2, etc., are determined according to a DRX period of the two carriers, and the UE compares on each evaluation point the acquired radio link quality parameter of the second carrier with the radio link quality parameter thresholds of the second carrier and triggers an out-of-sync indication on the evaluation point when the radio link quality parameter of the second carrier is below the first radio link quality parameter threshold of the second carrier or triggers an in-sync indication on the evaluation point when the radio link quality parameter of the second carrier is above the second radio link quality parameter threshold of the second carrier. That is, an in-sync indication or an out-of-sync indication is triggered on each of the evaluation points $X_0, X_1, X_2, X_3, X_4, X_5, \ldots, X_{k+2}$.

When a first number of out-of-sync indication are received continuously at the RRC layer of the UE from the physical layer (where the first number is N310 of e.g., 3, etc., in an LTE system) and all the timers T300, T301, T304 and T311 are disabled, the UE enables a preset timer, which is T310 in the LTE system, and when a second number of in-sync indications are received continuously at the RRC layer of the UE from the physical layer during counting of T310 (where the second number is N311 of e.g., 3, etc., in the LTE system), the UE disables the timer T310, that is, judges that the radio link of the UE does not fail; otherwise, when the UE does not receive continuously the number N311 of in-sync indications during counting of T310, the UE judges failure of the radio link of the UE, where the first number, the second number and the timer are configured at the network side in Radio Resource Control (RRC) signaling.

The foregoing implementation relates to the process of judging whether a radio link fails according to radio link quality parameters of two carriers, and it is believed that an implementation of judging whether the radio link fails when there are a plurality of carriers in the radio link can be apparent to those skilled in the art benefiting from the description of the foregoing implementation, and a repeated description thereof will be omitted here. A process of determining whether to trigger an in-sync indication or an out-of-sync indication according to radio link quality parameters and radio link quality parameter thresholds of at least two carriers in the radio link can be performed as in the specific methods according to the foregoing embodiments.

Figure 3:
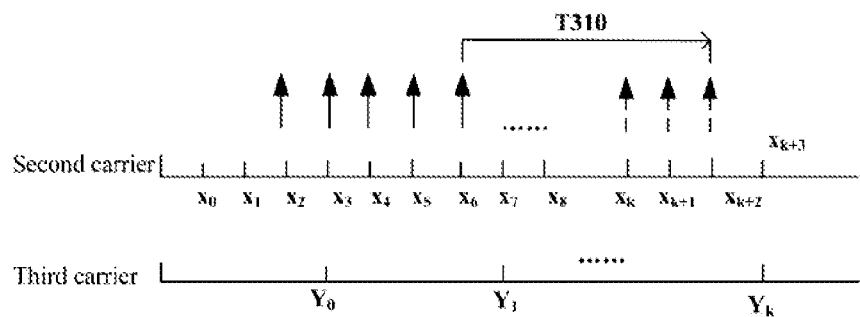
FIG. 3 is a second implementation of judging whether a radio link fails according to an embodiment of the invention.

FIG. 3 is an implementation in which an in-sync or out-of-sync indication is determined to be triggered to thereby judge whether a radio link fails when respective carriers are in different DRX modes or the respective carriers are in the same DRX mode but with different DRX periods according to an embodiment of the invention. The UE operates over two carriers, i.e., a second carrier and a third carrier, respectively, in different DRX modes in that the second carrier is in the non-DRX mode and the third carrier is in the DRX mode with a period of 40 ms, and respective evaluation points corresponding to the carrier with the shortest DRX period can be taken as evaluation points of the respective carrier in the radio link. Since the carrier with the shortest DRX period is the third carrier, a specific sub-frame of each radio frame (10 ms) can be taken as an evaluation point or presence of an evaluation point in each radio frame can be determined. In FIG. 3, there are 40 ms from an endpoint to $Y_0$ over the third carrier and four evaluation points present in a period of the DRX mode, that is, there are four evaluation points present between $Y_0$ and $Y_1$, which correspond respectively to $X_4, X_5, X_6$ and $X_7$ over the second carrier, where the evaluation point $X_3$ over the second carrier corresponds to the evaluation point $Y_0$ over the third carrier, the evaluation point $X_7$ over the second carrier corresponds to the evaluation point $Y_1$ over the third carrier, and the evaluation point $X_{k+3}$ over the second carrier corresponds to the evaluation point $Y_k$ over the third carrier (where K is an integer larger than one).

Radio link quality parameters of the two carriers are determined respectively, and when the two carriers correspond to the same radio link quality parameter thresholds, the radio link quality parameter of only the second carrier is present on the evaluation point $X_0$ of the second carrier, thus the radio link quality parameter is compared with the radio link quality parameter thresholds, and whether to trigger an in-sync indication or an out-of-sync indication is determined according to the result of comparison. The radio link quality parameter of only the second carrier is present on the evaluation points $X_1$, $X_2, X_4, X_5, X_6, \ldots, \ldots$, of the second carrier, i.e., the evaluation points of the second carrier which do not correspond to the third carrier, thus whether to trigger an in-sync indication or an out-of-sync indication is determined by comparing the radio link quality parameter of the second carrier with the radio link quality parameter thresholds. The radio link quality parameters of both the second carrier and the third carrier are present on the evaluation points $X_3$ ($Y_0$), $X7$ ($Y_1$), $\ldots, X_{k+3}$ ($Y_k$) of the second carrier correspondingly identical to the third carrier, the largest radio link quality parameter value among the radio link quality parameters of the two carriers is selected and compared with the radio link quality parameter thresholds, and whether to trigger an in-sync indication or an out-of-sync indication is determined according to the result of comparison.

When the two carriers correspond to different radio link quality parameter thresholds, the radio link quality parameter of each carrier is compared on each evaluation point with the radio link quality parameter threshold corresponding to the carrier, and whether to trigger an in-sync indication or an out-of-sync indication is determined according to the result of comparison. In FIG. 3, the radio link quality parameter of only the second carrier is present on the evaluation points of the second carrier which do not correspond to the third carrier, e.g., the evaluation points $X_1, X_2, X_4, X_5, X_6, \ldots X_{k+2}$, etc., thus the radio link quality parameter of the second carrier is compared with the radio link quality parameter threshold corresponding to the second carrier, and whether to trigger an in-sync indication or an out-of-sync indication is determined according to the result of comparison. The radio link quality parameters of both the second and the third carriers are present on the evaluation points of the second carrier corresponding to the third carrier, e.g., $X_3$ ($Y_0$), $X_7$ ($Y_1$), ..., $X_{k+3}$ ($Y_k$), etc., the radio link quality parameters of the two carriers are compared respectively with the radio link quality parameter thresholds corresponding to the carriers, and an out-of-sync indication is determined to be triggered on the evaluation points when the radio link quality parameters of both the carriers are below corresponding radio link quality parameter thresholds, or an in-sync indication is determined to be triggered on the evaluation points when the radio link quality parameter of the second carrier and/or the third carrier is above the second radio link quality parameter threshold corresponding to the carrier.

When the UE measures cell-specific reference signals of the two carriers and the measurement result of the second carrier is larger than that of the third carrier, the second carrier is determined as a first carrier involved in judgment of radio link failure, and the radio link quality parameter of the second carrier is acquired, or when the second carrier is an primary carrier, the radio link quality parameter of the primary carrier is acquired. When the two carriers are in different DRX modes, evaluation points, e.g., the respective evaluation points over the second carrier, as illustrated in FIG. 3, etc., are determined according to the carrier with the shortest DRX period, i.e., the third carrier, and the UE compares on each evaluation point the acquired radio link quality parameter of the second carrier with the radio link quality parameter threshold of the second carrier and triggers an out-of-sync indication on the evaluation point when the radio link quality parameter of the second carrier is below the second radio link quality parameter threshold of the second carrier or triggers an in-sync indication on the evaluation point when the radio link quality parameter of the second carrier is above the second radio link quality parameter threshold of the second carrier. That is, an in-sync indication or an out-of-sync indication is triggered on each of the evaluation points $X_0, X_1, X_2, X_3, X_4, X_5, X_6, \ldots, X_{k+2}$.

When a first number of out-of-sync indication are received continuously at the RRC layer of the UE from the physical layer (where the first number is N310 of e.g., 5, etc., in an LTE system) and all the timers T300, T301, T304 and T311 are disabled, the UE enables a preset timer, which is T310 in the LTE system, and when a second number of in-sync indications are received continuously at the RRC layer of the UE from the physical layer during counting of T310 (where the second number is N311 of e.g., 3, etc., in the LTE system), the UE disables the timer T310, that is, judges that the radio link thereof does not fail; otherwise, when the UE does not receive the number N311 of in-sync indications during counting of T310, the UE judges failure of the radio link thereof, where the first number, the second number and the timer are configured at the network side in Radio Resource Control (RRC) signaling.

The foregoing implementation relates to the process of judging whether a radio link fails according to radio link quality parameters of two carriers, and it is believed that an implementation of judging whether the radio link fails when there are a plurality of carriers in the radio link can be apparent to those skilled in the art benefiting from the description of the foregoing implementation, and a repeated description thereof will be omitted here. A process of determining whether to trigger an in-sync indication or an out-of-sync indication according to radio link quality parameters and radio link quality parameter thresholds of at least two carriers in the radio link can be performed as in the specific methods according to the foregoing embodiments.

Figure 4:
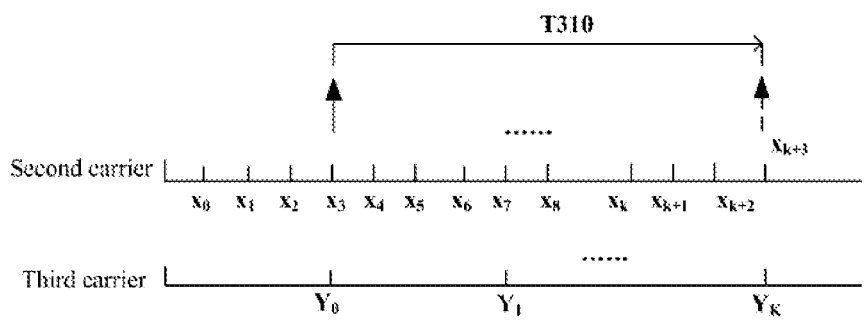
FIG. 4 is a third implementation of judging whether a radio link fails according to an embodiment of the invention.

FIG. 4 is an implementation in which respective evaluation points corresponding to the carrier with the longest DRX period are taken as evaluation points of respective carriers in a radio link to thereby judge whether the radio link fails on the evaluation points when the respective carriers are in different DRX modes according to an embodiment of the invention. For example, when the second carrier is in the non-DRX mode and the third carrier is in the DRX mode, the carrier with the longest DRX period in the radio link is the third carrier in the DRX mode with a period of 40 ms, and evaluation points are determined according to the period of the DRX mode, that is, an evaluation point is taken per 40 ms. As the evaluation points determined according to the period of the DRX mode of the third carrier, the evaluation points of the second carrier are $X_3, X_7, \ldots, X_{k+3}$, and the evaluation points of the third carrier are $Y_0, Y_1, \ldots, Y_k$ with the evaluation points $X_3$ corresponding to $Y_0$, $X_7$ corresponding to $Y_1, \ldots, X_{k+3}$ corresponding to $Y_k$, are as illustrated in FIG. 4.

A radio link quality parameter of each carrier is determined respectively, and when the two carriers correspond to the same radio link quality parameter thresholds on the corresponding evaluation points of the two carriers, the largest value among the radio link quality parameters of the two carriers are determined and compared with the radio link quality parameter thresholds, and an in-sync indication or an out-of-sync indication is determined to be triggered according to the result of comparison, that is, an in-sync indication or an out-of-sync indication is triggered on each of the evaluation points $X_3$ ($Y_0$), X7 ($Y_1$), ..., $X_{k+3}$ ($Y_k$). When the two carriers correspond to different radio link quality parameter thresholds, the radio link quality parameter of each carrier is compared on each evaluation point with the radio link quality parameter thresholds corresponding to the carrier, and whether to trigger an in-sync indication or an out-of-sync indication is determined according to the result of comparison. Since the respective evaluation points of the carrier with longest DRX period in the radio link are taken as evaluation points of the respective carriers in the radio link in the foregoing process, the radio link quality parameter of at least one carrier can be acquired on each evaluation point, and furthermore whether the radio link fails can be judged for the respective carriers corresponding to the same or different radio link quality parameter thresholds.

When the UE measures cell-specific reference signals of the two carriers and the measurement result of the second carrier is larger than that of the third carrier, the second carrier is determined as a first carrier involved in judgment of radio link failure, and the radio link quality parameter of the second carrier is acquired, or when the second carrier is an primary carrier, the radio link quality parameter of the primary carrier is acquired. When the two carriers are in different DRX modes, evaluation points, e.g., the respective evaluation points $X_3, X_7, \ldots, X_{k+3}$, over the second carrier, as illustrated in FIG. 4, etc., are determined according to the carrier with the longest DRX period, and the UE compares on each evaluation point the acquired radio link quality parameter of the second carrier with the radio link quality parameter threshold of the second carrier and triggers an out-of-sync indication on the evaluation point when the radio link quality parameter of the second carrier is below the first radio link quality parameter threshold of the second carrier or triggers an in-sync indication on the evaluation point when the radio link quality parameter of the second carrier is above the second radio link quality parameter threshold of the second carrier. That is, an in-sync indication or an out-of-sync indication is triggered on each of the evaluation points $X_3, X_7, \ldots, X_{k+3}$.

When a first number of out-of-sync indication are received continuously at the RRC layer of the UE from the physical layer thereof (where the first number is N310 of e.g., 1, etc., in an LTE system) and all the timers T300, T301, T304 and T311 are disabled, the UE enables a preset timer, which is T310 in the LTE system, and when a second number of in-sync indications are received continuously at the RRC layer of the UE from the physical layer thereof during counting of T310 (where the second number is N311 of e.g., 1, etc., in the LTE system), the UE disables the timer T310, that is, judges that the radio link thereof does not fail; otherwise, when the UE does not receive the number N311 of in-sync indications during counting of T310, the UE judges failure of the radio link thereof, where the first number, the second number and the timer are configured at the network side in Radio Resource Control (RRC) signaling.

The foregoing implementation relates to the process of judging whether a radio link fails according to radio link quality parameters of two carriers, and it is believed that an implementation of judging whether the radio link fails when there are a plurality of carriers in the radio link can be apparent to those skilled in the art benefiting from the description of the foregoing implementation, and a repeated description thereof will be omitted here. A process of determining whether to trigger an in-sync indication or an out-of-sync indication according to radio link quality parameters and radio link quality parameter thresholds of at least two carriers in the radio link can be performed as in the specific methods according to the foregoing embodiments.

In the foregoing implementation, the UE takes the evaluation points of the carrier with the shortest DRX period or the carrier with the longest DRX period as evaluation points of the respective carriers in the radio link, thus the DRX periods of the respective carriers shall be taken into account when the number of received out-of-sync indications (i.e., the first number) is configured at the network side in RRC signaling, to thereby ensure that the radio link parameter of the carrier with the longest period can be involved in comparison for at least a preset number, e.g., M, etc., of times, where M is an integer no smaller than one and the value of M is configured at the RRC layer of the network side and issued to the UE, and the value of M configured at the RRC layer of the network side is related to the DRX period of the carrier, that is, the value of M has a specific correspondence relationship with the DRX period of the carrier, or the value of M has a specific relationship with the ratio of the DRX periods of the carriers, for example, if the longest and smallest DRX periods of the respective carriers are $T_{max}$ and $T_{min}$, and the DRX period corresponding to a carrier in a non-DRX mode can be determined as 1 ms, then a specific relationship of the value of M with $T_{max}/T_{min}$ can be determined.

Figure 5:
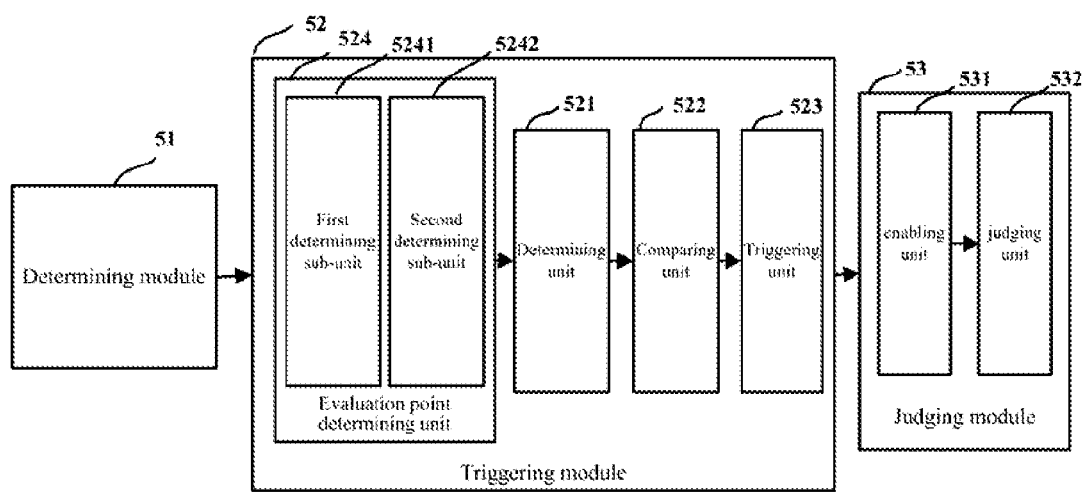
FIG. 5 is a schematic structural diagram of a device for judging radio link failure in carrier aggregation according to an embodiment of the invention.

FIG. 5 is a device for judging radio link failure in carrier aggregation according to an embodiment of the invention, which is generally applicable to a user equipment and which includes:

a determining module 51 configured to determine radio link quality parameters of one or more carriers involved in judgment of radio link failure;

a triggering module 52 configured to compare on evaluation points each determined radio link quality parameter with a corresponding radio link quality parameter threshold and to determine whether to trigger an in-sync indication or an out-of-sync indication on the evaluation points; and a judging module 53 configured to judge failure of a radio link of the UE when a preset number of in-sync indications are not received continuously in a preset judgment length of time.

In alternative embodiments, the determining module 51 is particularly configured:

To determine respective carriers of the user equipment as carriers involved in judgment of radio link failure, to measure cell-specific reference signals of the respective carriers, and to determine the radio link quality parameters corresponding to the respective carriers according to the results of measurement; or To measure cell-specific reference signals of the respective carriers, to select the largest value among measurement results of the respective carriers, to determine a first carrier corresponding to the largest value as a carrier involved in judgment of radio link failure, and to acquire the radio link quality parameter corresponding to the first carrier according to the largest value; or To determine an primary carrier of the user equipment as a carrier involved in judgment of radio link failure, to measure a cell-specific reference signal of the primary carrier, and to determine the radio link quality parameter corresponding to the primary carrier according to the result of measurement.

Preferably the triggering module 52 is particularly configured to determine on the evaluation points an out-of-sync indication to be triggered if none of the radio link quality measurement values of the respective one or more carriers involved in judgment of radio link failure is above a first radio link quality parameter threshold corresponding to the same carrier, or an in-sync indication to be triggered if one of the radio link quality measurement values is above a second radio link quality parameter threshold corresponding to the same carrier.

Further in a preferred embodiment, the triggering module 52 particularly includes:

a determining unit 521 configured to determine whether the respective carriers correspond to the same radio link quality parameter threshold;

a comparing unit 522 configured to select the largest value among the radio link quality parameters of the respective carriers and compare the largest value with the radio link quality parameter threshold when the respective carriers correspond to the same radio link quality parameter threshold, or to compare the radio link quality parameter of each carrier with the radio link quality parameter threshold corresponding to the carrier when the respective carriers correspond to different radio link quality parameter thresholds; and a triggering unit 523 configured to trigger an out-of-sync indication on the evaluation points when the largest value is below the first radio link quality parameter threshold or trigger an in-sync indication on the evaluation points when the largest value is above the second radio link quality parameter threshold, when the respective carriers correspond to the same radio link quality parameter threshold; or to trigger an out-of-sync indication on the evaluation points when all the radio link quality parameter of the respective carriers are below the first radio link quality parameter threshold corresponding to the respective carrier or trigger an in-sync indication on the evaluation points when the radio link quality parameter of at least one carrier is above the second radio link quality parameter threshold corresponding to the carrier, when the respective carriers correspond to different radio link quality parameter thresholds.

Further the triggering module 52 further includes:

an evaluation point determining unit 524 configured to determine whether the respective carriers are in the same DRX mode and to determine the evaluation points according to the result of determination.

The evaluation point determining unit 524 particularly includes:

a first determining sub-unit 5241 configured to determine the evaluation points according to the DRX period of the respective carriers when the respective carriers are in the same DRX mode and with the same DRX carrier; and a second determining sub-unit 5242 configured to select the carrier with the shortest DRX period and determine the evaluation points according to the carrier or select the carrier with the longest DRX period and determine the evaluation points according to the carrier, when the respective carriers are in different DRX modes or the respective carriers are in the same DRX mode but with different DRX periods.

The judging module 53 particularly includes:

an enabling unit 531 configured to enable a timer to monitor for the preset length of time upon continuous reception of a first number of out-of-sync indications; and a judging unit 532 configured to judge failure of the radio link of the UE when a second number of in-sync indications are not received continuously during operation of the timer.

The embodiments of the invention provide a method and device for judging radio link failure in carrier aggregation, and in the method, determined radio link quality parameters of a carrier(s) involved in judgment of radio link failure are compared on evaluation points with corresponding radio link quality parameter thresholds, it is determined whether to trigger an in-sync indication or an out-of-sync indication on the evaluation points, and whether a radio link of the UE fails is judged according to the number of continuously received in-sync indications or out-of-sync indications, and thus the radio link quality parameters of the UE's carrier(s) involved in judgment are compared on evaluation points with the corresponding radio link quality parameter thresholds thereof to thereby judge whether the radio link of the UE fails in carrier aggregation.

Those skilled in the art shall appreciate that the embodiments of the invention can be embodied as a method, system or computer program product. Therefore, the invention can be embodied in the form of an all-hardware embodiment, an all-software embodiment or an embodiment of software and hardware aspects in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, device (system) and computer program product according to the embodiments of the invention. It shall be appreciated that respective flows and/or blocks in the flow chart and/or the block diagram and combinations of the flows and/or blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

What is claimed is:

1. A method for judging radio link failure in carrier aggregation, comprising:

a User Equipment (UE) determining radio link quality parameters of one or more carriers involved in judgment of radio link failure, wherein the radio link parameter of each carrier involved in the judgment is obtained by measuring a cell-specific reference signal of the carrier more than once within each evaluation period and filtering measurement results on a evaluation point of each evaluation period, the evaluation point is an end of the evaluation period;

the UE comparing on evaluation points each determined radio link quality parameter with a corresponding radio link quality parameter threshold and determining whether to trigger an in-sync indication or an out-of-sync indication on the evaluation points;

judging failure of a radio link of the UE when the UE does not receive continuously a preset number of in-sync indications in a preset judgment length of time;

wherein the UE comparing on evaluation points each determined radio link quality parameter with a corresponding radio link quality parameter threshold and determining whether to trigger an in-sync indication or an out-of-sync indication on the evaluation points comprises:

determining whether the respective carriers correspond to the same radio link quality parameter threshold, wherein each radio link quality parameter threshold comprises a first radio link quality parameter threshold and a second radio link quality parameter threshold, and wherein the second radio link quality parameter threshold is above the first radio link quality parameter threshold; and when the respective carriers correspond to the same radio link quality parameter threshold, selecting the largest value among the radio link quality parameters of the respective carriers, comparing the largest value with the radio link quality parameter threshold, and triggering an out-of-sync indication on the evaluation points when the largest value is below the first radio link quality parameter threshold, or triggering an in-sync indication on the evaluation points when the largest value is above the second radio link quality parameter threshold, or triggering neither in-sync indication nor out-of-sync indication on the evaluation points when the largest value is between the first radio link quality parameter threshold and the second radio link quality parameter threshold, or when the respective carriers correspond to different radio link quality parameter thresholds, comparing the radio link quality parameter of each carrier with the radio link quality parameter threshold corresponding to the carrier, and triggering an out-of sync indication on the evaluation points when all the radio link quality parameters of respective carriers are below first radio link quality parameter thresholds corresponding to the respective carriers, or triggering an in-sync indication on the evaluation points when the radio link quality parameter of at least one carrier is above the second radio link quality parameter threshold corresponding to the carrier, or triggering neither in-sync indication nor out-of-sync indication on the evaluation points when all the radio link quality parameters of respective carriers are below or equal to second radio link quality parameter thresholds corresponding to the respective carriers and the radio link quality parameter of at least one carrier is above or equal to the first radio link quality parameter threshold corresponding to the carrier.

2. The method of claim 1, wherein the determining radio link quality parameters of one or more carriers involved in judgment of radio link failure comprises:

determining respective carriers of the UE as carriers involved in judgment of radio link failure, measuring cell-specific reference signals of the respective carriers more than once within the evaluation period, and filtering measurement results on the evaluation point of the evaluation period to obtain the radio link quality parameters corresponding to the respective carriers according to the results of measurement; or measuring cell-specific reference signals of the respective carriers, selecting the largest value among measurement results of the respective carriers, determining a first carrier corresponding to the largest value as a miler involved in judgment of radio link failure, measuring the cell-specific reference signal of the first carrier more than once within the evaluation period, and filtering measurement results on the evaluation point of the evaluation period to obtain the radio link quality parameter corresponding to the first carrier according to the largest value; or determining a primary carrier of the UE as a carrier involved in judgment of radio link failure, measuring the cell-specific reference signal of the primary carrier more than once within the evaluation period, and filtering measurement results on the evaluation point of the evaluation period to obtain the radio link quality parameter corresponding to the primary carrier according to the result of measurement.

3. The method of claim 1, wherein the UE judging failure of a radio link of the UE when a preset number of in-sync indications are not received continuously in a preset length of time comprises:

the UE enabling a timer to monitor for the preset length of time upon continuous reception of a first number of out-of-sync indications; and judging failure of the radio link of the UE when a second number of in-sync indications are not received continuously during operation of the timer.

4. The method of claim 3, wherein the first number, the second number and the timer are configured at the network side in Radio Resource Control (RRC) signaling.

5. The method of claim 3, wherein the first number is configured at the network side according to a preset number of times that the carrier of the UE with the longest period is involved in comparison of the radio link quality parameter.

6. The method of claim 5, wherein the preset number of times is no smaller than one.

7. The method of claim 1, wherein determining the evaluation points comprises:

determining whether the respective carriers are in a Discontinuous Reception (DRX) mode, wherein the determining whether the respective carriers are in a DRX mode includes determining whether the respective carriers are in the same DRX mode; and determining the evaluation points according to the result of determination.

8. The method of claim 7, wherein the determining the evaluation points according to the result of determination comprises:

determining the evaluation points according to the DRX period of the respective carriers when the respective carriers are in the same DRX mode and with the same DRX period; and selecting the carrier with the shortest DRX period and determining the evaluation points according to the selected carrier or selecting the carrier with the longest DRX period and determining the evaluation points according to the selected carrier, when the respective carriers are in different DRX modes or the respective carriers are in the same DRX mode but with different DRX periods.

9. The method of claim 1, wherein the carriers comprise:

an activated carrier configured at the Radio Resource Control (RRC) layer of the network side, wherein the activated carrier is the carrier on which the UE performs uplink and downlink transmission and performs Channel Quality Indicator (CQI) measurement; or an independently operating carrier, the independently operating carrier is the carrier which operates as independent cell without relying on another carrier; or a primary carrier configured at the RRC layer of the network side.

10. A device for judging radio link failure in carrier aggregation, comprising:

a determining module configured to determine radio link quality parameters of one or more carriers involved in judgment of radio link failure, wherein the radio link parameter of each carrier involved in the judgment is obtained by measuring a cell-specific reference signal of the carrier more than once within each evaluation period and filtering measurement results on a evaluation point of each evaluation period, the evaluation point is an end of the evaluation period;

a triggering module configured to compare on evaluation points each determined radio link quality parameter with a corresponding radio link quality parameter threshold and to determine whether to trigger an in-sync indication or an out-of-sync indication on the evaluation points; and a judging module configured to judge failure of a radio link of a User Equipment (UE) when a preset number of in-sync indications are not received continuously in a preset judgment length of time;

wherein the triggering module comprises:
  a determining unit configured to determine whether the respective carriers correspond to the same radio link quality parameter threshold, wherein each radio link quality parameter threshold comprises a first radio link quality parameter threshold and a second radio link quality parameter threshold, and wherein the second radio link quality parameter threshold is above the first radio link quality parameter threshold;
  a comparing unit configured to select the largest value among the radio link quality parameters of the respective carriers and compare the largest value with the radio link quality parameter threshold when the respective carriers correspond to the same radio link quality parameter threshold, or to compare the radio link quality parameter of each carrier with the radio link quality parameter threshold corresponding to the carrier when the respective carriers correspond to different radio link quality parameter thresholds; and
  a triggering unit configured to trigger an out-of-sync indication on the evaluation points when the largest value is below the first radio link quality parameter threshold or trigger an in-sync indication on the evaluation points when the largest value is above the second radio link quality parameter threshold or trigger neither in-sync indication nor out-of-sync indication on the evaluation points when the largest value is between the first radio link quality parameter threshold and the second radio link quality parameter threshold, when the respective carriers correspond to the same radio link quality parameter threshold; or to trigger an out-of-sync indication on the evaluation points when all the radio link quality parameters of the respective carrier are below the first radio link quality parameter thresholds corresponding to the respective carriers or trigger an in-sync indication on the evaluation points when the radio link quality parameter of at least one carrier is above the second radio link quality parameter threshold corresponding to the carrier or trigger neither in-sync indication nor out-of-sync indication on the evaluations when all the radio link quality parameter of respective carriers are below or equal to second radio link quality parameter thresholds corresponding to the respective carriers and the radio link quality parameter of at least one carrier is above or equal to the first radio link quality parameter threshold corresponding to the carrier, when the respective carriers correspond to different radio link quality parameter thresholds.

11. The device of claim 10, wherein the determining module is configured to determine respective carriers of the user equipment as carriers involved in judgment of radio link failure, to measure cell-specific reference signals of the respective carriers more than once within the evaluation period, and to filter measurement results on an evaluation point of the evaluation period to obtain the radio link quality parameters corresponding to the respective carriers according to the results of measurement; or
  the determining module is configured to measure cell-specific reference signals of the respective carriers, to select the largest value among measurement results of the respective carriers, to determine a first carrier corresponding to the largest value as a carrier involved in judgment of radio link failure, to measure the cell-specific reference signal of the first carrier more than once within the evaluation period, and to filter measurement results on the evaluation point of the evaluation period to obtain the radio link quality parameter corresponding to the first carrier according to the largest value; or
  the determining module is configured to determine a primary carrier of the user equipment as a carrier involved in judgment of radio link failure, to measure the cell-specific reference signal of the primary carrier more than once within the evaluation period, and to filter measurement results on the evaluation point of the evaluation period to obtain the radio link quality parameter corresponding to the primary carrier according to the result of measurement.

12. The device of claim 10, wherein the triggering module further comprises:
  an evaluation point determining unit configured to determine whether the respective carriers are in a Discontinuous Reception (DRX) mode wherein the determining whether the respective carriers are in a DRX mode includes determining whether the respective carriers are in the same DRX mode and to determine the evaluation points according to the result of determination.

13. The device of claim 12, wherein the evaluation point determining unit comprises:
  a first determining sub-unit configured to determine the evaluation points according to the DRX period of the respective carriers when the respective carriers are in the same DRX mode and with the same DRX period; and
  a second determining sub-unit configured to select the carrier with the shortest DRX period and determine the evaluation points according to the carrier or select the carrier with the longest DRX period and determine the evaluation points according to the carrier, when the respective carriers are in different DRX modes or the respective carriers are in the same DRX mode but with different DRX periods.

14. The device of claim 10, wherein the judging module comprises:
  an enabling unit configured to enable a timer to monitor for the preset length of time upon continuous reception of a first number of out-of-sync indications; and
  a judging unit configured to judge failure of the radio link of the UE when a second number of in-sync indications are not received continuously during operation of the timer.

* * * * *